(12) United States Patent
Tummala (10) Patent No.: US 11,427,273 B2
(45) Date of Patent: Aug. 30, 2022

(54) STABILIZING DEVICE

(71) Applicant: Uday Tummala, Hyderabad (IN)

(72) Inventor: Uday Tummala, Hyderabad (IN)

( * ) Notice: Subject to any disclaimer, the term of this patent is extended or adjusted under 35 U.S.C. 154(b) by 357 days.

(21) Appl. No.: 16/644,331

(22) PCT Filed: Jun. 12, 2018

(86) PCT No.: PCT/IB2018/054237
§ 371 (c)(1),
(2) Date: Mar. 4, 2020

(87) PCT Pub. No.: WO2019/043467
PCT Pub. Date: Mar. 7, 2019

(65) Prior Publication Data
US 2020/0269940 A1    Aug. 27, 2020

(30) Foreign Application Priority Data

Sep. 4, 2017  (IN) .............................. 201741031233

(51) Int. Cl.
*B62H 1/12* (2006.01)
*B62D 37/06* (2006.01)

(52) U.S. Cl.
CPC .............. *B62H 1/12* (2013.01); *B62D 37/06* (2013.01); *B62H 2700/00* (2013.01)

(58) Field of Classification Search
CPC ....... B62H 1/12; B62H 2700/00; B62D 37/06
See application file for complete search history.

(56) References Cited

U.S. PATENT DOCUMENTS

| 7,006,901 | B2 | 2/2006 | Wang | |
|---|---|---|---|---|
| 2004/0098185 | A1 | 5/2004 | Wang | |
| 2010/0274445 | A1* | 10/2010 | Haynes | B62H 1/12 180/209 |

FOREIGN PATENT DOCUMENTS

| CN | 109649536 | A | * | 4/2019 | ............... | B62H 1/12 |
|---|---|---|---|---|---|---|
| CN | 112278125 | A | * | 1/2021 | ............... | B62H 1/12 |
| CN | 113525539 | A | * | 10/2021 | | |
| CN | 112874676 | B | * | 2/2022 | ............... | B62H 1/12 |
| DE | 202012101280 | | | 7/2012 | | |
| WO | WO-2021258151 | A1 | * | 12/2021 | | |
| WO | WO-2022029274 | A1 | * | 2/2022 | | |

OTHER PUBLICATIONS

International Search Report in International Patent Application No. PCT/IB2018/054237, dated Oct. 5, 2018.
Written Opinion in International Patent Application No. PCT/IB2018/054237, dated Oct. 5, 2018.

\* cited by examiner

*Primary Examiner* — Kevin Hurley
(74) *Attorney, Agent, or Firm* — Greenblum & Bernstein, P.L.C.

(57) ABSTRACT

The present disclosure relates to a stabilizing device for a vehicle. More particularly, but not exclusively, to a device to prevent unstable condition and a tip over for a two-wheeled vehicle, such as a motorcycle or the like. The stabilizing device comprises of a fixing unit, a first slidable unit, a second slidable unit, a first support arm, a second support arm, a wheel and a control unit. The stabilizing device of the present disclosure provides a cost-effective, rapidly acting, customizable, reliable and fully automatic solution for balancing the vehicle.

13 Claims, 4 Drawing Sheets

STABILIZING DEVICE

TECHNICAL FIELD

The present subject matter is related to automobiles. More particularly, but not exclusively, to a stabilizing device to prevent tip over of a two-wheeled vehicle, such as a motorcycle or the like.

BACKGROUND OF THE DISCLOSURE

In general, any two-wheeled vehicle is more likely to encounter tip over, especially if the vehicle travels too fast and makes any abrupt turn. While riding a two-wheeled vehicle, one of the most difficult aspects for a driver is to manoeuvre the vehicle at high speeds maintaining an appropriate lean angle to balance an increasing centrifugal force. This requires a high degree of skill and suitable environmental conditions. If the driver is unsuccessful to attain the required lean angle and/or if the environmental conditions like frictional and/or gravitational components, road type, rain, slope and like are severe, the two-wheeled vehicle would tip over due to improper balancing of the vehicle. Therefore, stabilization of the vehicle is of prime importance to prevent sporadic danger to the safety of rider.

Conventionally, various devices with electrical, hydraulic, electro-hydraulic and mechanical techniques are employed in a vehicle that causes a set of support arms, having a subsidiary wheel, to extend to the road and to prevent tip over of the vehicle. These devices are manually or electronically operated between a raised inoperative position and lowered ground-engaging position. These conventional devices are similar to a deployable kickstand having a subsidiary wheel or like a training wheels found in a bicycle. However, there remains an opportunity to improve these devices into more progressive device which is fully autonomous, rapidly actuatable, rigid and compactly concealed from sight until it is deployed eliminating relatively complex and cumbersome arrangements.

The information disclosed in this background of the disclosure section is only for enhancement of understanding of the general background of the invention and should not be taken as an acknowledgement or any form of suggestion that this information forms the prior art already known to a person skilled in the art.

SUMMARY

The one or more shortcomings of the prior art are overcome by a process as claimed and additional advantages are provided through the provision of mechanism as claimed in the present disclosure.

The present disclosure provides a stabilizing device for a vehicle comprising, at least one fixing unit, a pair of slide rails, a first slidable unit, a second slidable unit, a plunging element, a first support arm, a second support arm, and a control unit.

The fixing unit is coupled to a base of the vehicle, wherein the fixing unit is defined by a main plate having a pair of side strips formed at opposite sides of the main plate. The pair of side strips extend along longitudinal direction of the main plate. Further, the pair of slide rails mounted centrally on the main plate and parallel to the pair of side strips extend along longitudinal direction of the main plate. The first slidable unit and the second slidable unit, each are coupled to the fixing unit and are configured to slide about the pair of side strips along the longitudinal direction of the main plate. Further, the plunging element coupled to each of the first slidable unit and the second slidable unit is disposed in parallel relation with respect to the pair of slide rails. The present disclosure further includes the first support arm and the second support arm respectively coupled to the first slidable unit and the second slidable unit at one end and pivotably coupled to the common wheel at another end. The first support arm and the second support arm are configured to deploy in one of outward and inward direction about a vertical axis of the vehicle.

Further, the control unit is coupled to the pair of slide rails, wherein the control unit is configured to generate a magnetic field, by passing an electric current, in the slide rails and the plunging element. The magnetic field generated in the slide rails and the plunging element is perpendicular to each other such that the plunging elements provides a motion, due to electromagnetic propulsion to the first slidable unit and the second slidable unit, thereby initiating the deployment of the first support arm and the second support arm to extend in one of outward and inward direction about the vertical axis of the vehicle to stabilize the vehicle.

In an embodiment, the control unit is coupled with a plurality of sensors mounted on the vehicle and communicatively coupled with the control unit, wherein the sensors are configured to detect an unstable condition of the vehicle, generate a stabilizing signal upon detection, and transmit the stabilizing signal to the control unit.

In an embodiment, the pair of slide rails comprises a first segment in a spaced apart configuration with a second segment, and the first segment is parallel to the second segment. In an embodiment, the pair of slide rails mounted on the main plate are made of magnetic, electromagnetic material or adhered with magnetic materials.

In another embodiment, each of the first slidable unit and the second slidable unit comprises a base plate having a pair of side flanges formed at opposite sides of the base plate that extends along the longitudinal direction of the base plate. Further, each of the pair of side flanges is configured with a guideway for guiding through the fixed unit.

In another embodiment, the first slider unit and the second slider unit are configured to move towards each other when the first support arm and the second support arm extend in the outward direction about the vertical axis of the vehicle. Further the first slider unit and the second slider unit are configured to move apart from each other when the first support arm and the second support arm to extend in inward direction about the vertical axis of the vehicle.

In another embodiment, the first slidable unit and the second slidable unit are actuated by hydraulic, pneumatic, resilient members and any combination thereof.

The stabilizing device further comprises a power source module which is in communication with the plurality of sensors and the control unit. The power source module is configured to supply power to the plurality of sensors and the control unit.

In an embodiment, the plurality of sensors includes at least one speed sensor, at least one gyroscopic sensor, at least one accelerometer sensor and at least one position sensor.

The stabilizing device further includes an energizing unit which is coupled to the control unit and is configured to supply constant electric current to the plunging elements and the pair of slide rails.

In an embodiment, the fixing unit is detachably coupled to a support plate, and the support plate is detachably connected to the base of the vehicle.

In another embodiment, the fixing unit and the support plate are covered by removable sheath to prevent incoming of foreign particles, dust particle and, moisture into the first slidable unit, the second slidable unit and the pair of slide rails.

Additional features and advantages are realized through the techniques of the present disclosure. Other embodiments and aspects of the disclosure are described in detail herein and are considered a part of the claimed disclosure.

BRIEF DESCRIPTION OF THE DRAWINGS

The novel features and characteristics of the disclosure are explained herein. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawing in which.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or process that comprises a list of components or steps does not include only those components or steps but may include other components or steps not expressly listed or inherent to such setup or device or process. In other words, one or more elements in a system or apparatus proceeded by "comprises . . . a" does not, without more constraints, preclude the existence of other elements or additional elements in the system or apparatus.

Accordingly, the aim of the present disclosure is to provide a stabilizing device to stabilise and prevent tip over of a vehicle.

Embodiments of the present disclosure, relates to a stabilizing device 100 as shown from FIG. 1 to FIG. 8, comprising at least a fixing unit 10, a first slidable unit 20, a second slidable unit 30, a first support arm 40, a second support arm 50, a plunging element 23, 33, a control unit 112 and a wheel 60.

The fixing unit 10 is substantially a flat body having a main plate 11 with a pair of side strips 12 formed at opposite sides of the main plate 11. The side strips 12 extend along the longitudinal direction of the opposite sides of the main plate 11. The fixing unit 10 is coupled to a base of the vehicle 70. In an embodiment, the fixing unit 10 is mounted over a frame adjacent to the sides of the vehicle 70 (shown in FIG. 5). Further the fixing unit 10 comprises the pair of slide rails 13 mounted centrally on the main plate 11. The pair of side rails 13 are configured parallel to the pair of side strips 12 and extend along the longitudinal direction of the main plate 11. In an embodiment, the pair of slide rails 13 comprises a first segment 13a and a second segment 13b, wherein the first segment 13a is in spaced apart configuration with the second segment 13b. Also, the first segment 13a is disposed parallel to the second segment 13b. The first segment 13a of the slide rails 13 extends longitudinally from one end of the fixing unit 10 and the second segment 13b of slide rails 13 extends longitudinally from another end of the fixing unit 10. The first segment 13a and the second segment 13b are configured to form a slit 13c, central to the fixing unit 10. In an embodiment, the slide rails 13 are made of magnetic materials, electro-magnetic materials, adhered with magnetic elements or any equivalent material thereof.

Figure 3:
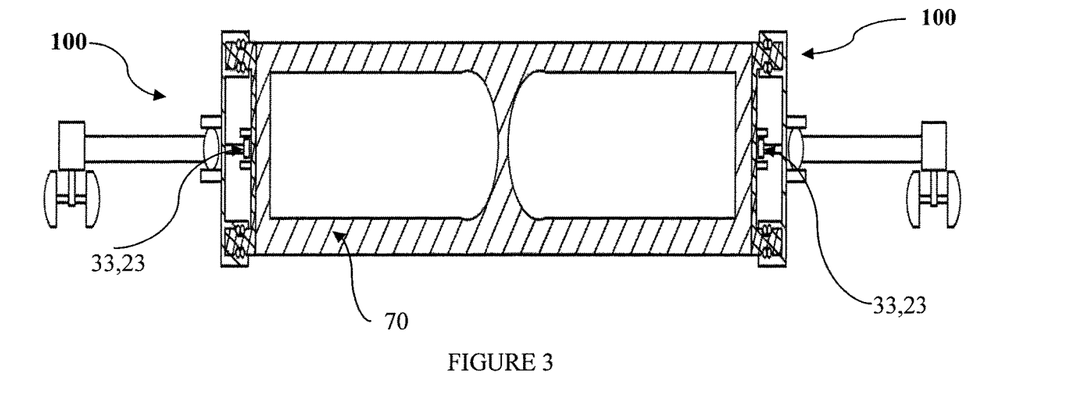
FIG. 3 illustrates a sectional view of a stabilizing device mounted onto a vehicle, in accordance with an embodiment of the present disclosure.

The stabilising device 100 further comprises the first slidable unit 20 coupled to the fixing unit 10. The first slidable unit 20 is configured to slide about the pair of side strips 12 in longitudinal direction of the main plate 11. The first slidable unit 20 is substantially a flat body having a base plate 21 and a pair of side flanges 22 formed at opposite sides of the base plate 21. As shown in FIG. 3, the first slidable unit 20 further includes the plunging element 23 positioned in parallel relation with respect to the first segment 13a of slide rails 13.

Similarly, the second slidable unit 30 has a base plate 31, a pair of flanges 32 and the plunging element 33, wherein the plunging element 33 is positioned in parallel relation with respect to the second segment 13b of slide rails 13. In an embodiment, the first slidable unit 20 and the second slidable unit 30 having each of the pair of side flanges 22, 32 is configured with a guideway for guiding through the fixed unit 10.

In an embodiment, the first slidable unit 20 and the second slidable unit 30 are interposed by a resilient member 34 to resist movement of the first slidable unit 20 and the second slidable unit 30 towards or away each other. In an embodiment, the first slidable unit 20 and the second slidable unit 30 can be actuated by one of hydraulic, pneumatic, resilient members and any combination thereof.

The present disclosure further includes the first support arm 40 and the second support arm 50. The first support arm 40 and the second support arm 50 respectively are coupled to the first slidable unit at one end (41, 51), and pivotably connected to the wheel 60 at another end (42, 52). More specifically, the first support arm 40 is substantially a rigid member extending away from the first slidable unit 20 and is defined by a proximal end 41 and a distal end 42. The proximal end 41 of the first support arm 40 is pivotally coupled to the base plate 21 of the first slidable unit 20. Further, the distal end 42 of the first support arm 40 is pivotally coupled to the subsidiary wheel 60. Similarly, the second support arm 50 is substantially a rigid member extending away from the second slidable unit 30 and defined by a proximal end 51 and a distal end 52. The proximal end 51 of the second support arm 50 is pivotally coupled to the base plate 31 and the distal end 52 of the second support arm 50 is pivotally coupled to the subsidiary wheel 60. The first support arm 40 and the second support arm 50 are configured to deploy in outward and inward direction about vertical axis of the vehicle 70 during when activated.

In an embodiment, the wheel 60 is coupled to the first support arm 40 and the second support arm 50 by a tie rod bearing. Further, the wheel 60 can be for example, a castor wheel or any other wheel that facilitates the rolling action when in contact with the ground.

The stabilizing device 100 of the present disclosure further includes the control unit 112 (shown in FIG. 7) that is coupled to the pair of slide rails 13, wherein the control unit 112 is configured to generate a magnetic field, by passing electric current, in the pair of slide rails 13 and the plunging elements 23, 33.

Figure 7:
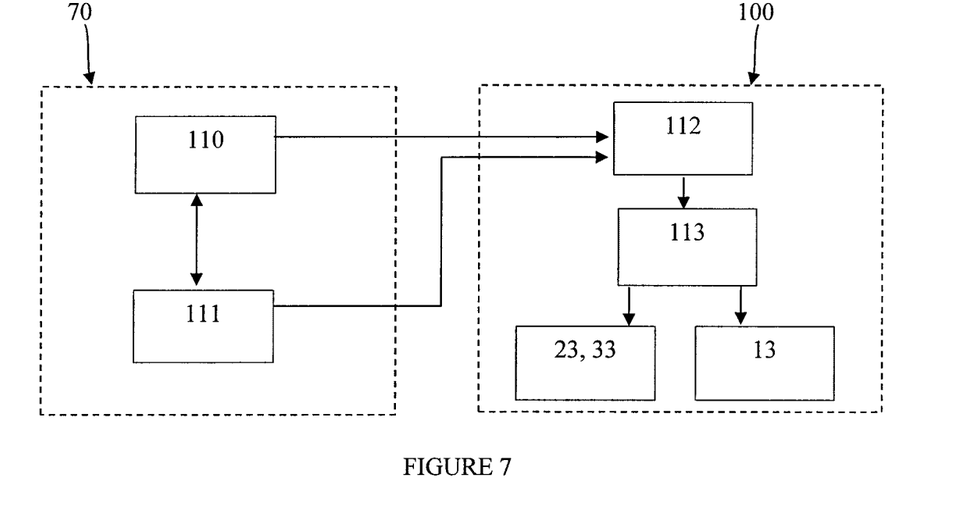
FIG. 7 illustrates a block diagram of system that uses the stabilizing device of FIG. 1, in accordance with an embodiment of the present disclosure.

In an embodiment, the control unit 112 is employed to automatically control a position of the subsidiary wheel 60 with respect to the ground surface based on the impact exerted on the vehicle 70. In another embodiment, the control unit 112 controls the flow and polarity of electric current passing through the slide rails 13 and the plunging elements 23, 33.

The stabilizing device 100 comprises a plurality of sensors 110 mounted on the vehicle 70 and communicatively coupled with the control unit 112. In an example, the plurality of sensors 110 may be at least one speed sensor, gyroscopic sensor, accelerometer sensor and position sensor. The sensors 110 are configured to detect an unstable condition of the vehicle 70 during the movement of the vehicle 70. Upon detecting the unstable condition of the vehicle 70, the plurality of sensors 110 generate a stabilizing signal and transmit the stabilizing signal to the control unit 112. The stabilising signal is generated by considering a set of parameters that includes, speed of the vehicle 70, acceleration of the vehicle 70, an orientation of the vehicle 70, and angular velocity of the vehicle 70 obtained from the plurality of sensors 110. Each of the set of parameters has a predetermined value. Based on the set of parameters, the plurality of sensors 110 generate the stabilizing signal and transmits to the control unit 112. The control unit 112 receives and processes the stabilizing signal to activate the deployment of stabilizing device 100. In another embodiment, the vehicle 70 may comprise the control unit 112 that comprise a user input device (not shown in figures), a system display (not shown in figures), a processor (not shown in figures), and a memory (not shown in figures). The control unit 112 processes the stabilizing signal with respect to the set of parameters. In another embodiment, the control unit 112 may be disposed within structure of the vehicle 70.

Referring to FIG. 7, the stabilizing device 100, further comprises a power source module 111 that is in communication with the plurality of sensors 110 and the control unit 112. The power source module 111 is configured to supply power to the plurality of sensors 110 and the control unit 112. In another embodiment, the power from the vehicle 70 may be utilised to supply power to the control unit 112 and the plurality of sensors 110.

The stabilising device 100 further includes an energizing unit 113 coupled to the control unit 112. The energizing unit 113 is configured to supply a constant electric current to the plunging element 23, 33 and the pair of rails 13 upon receiving instructions from the control unit 112. After receiving the electric current generated by the energizing unit 113, the pair of slide rails 13 are configured to generate a magnetic field. Concurrently, the electric current is passed through the plunging elements 23, 33 such that the electrical current passing through the plunging elements 23, 33 is perpendicular to the magnetic field generated through the pair of slide rails 13. Subsequently, an electromagnetic propulsion is initiated which results in a force, on the plunging elements 23, 33, perpendicular to both the current path and the magnetic field. This force results in the movement of the plunging elements 23, 33 along the pair of slide rails 13 i.e., in longitudinal direction of the fixing unit 10. The plunging elements (23, 33) in turn moves the first and the second slidable units 20, 30.

Figure 1:
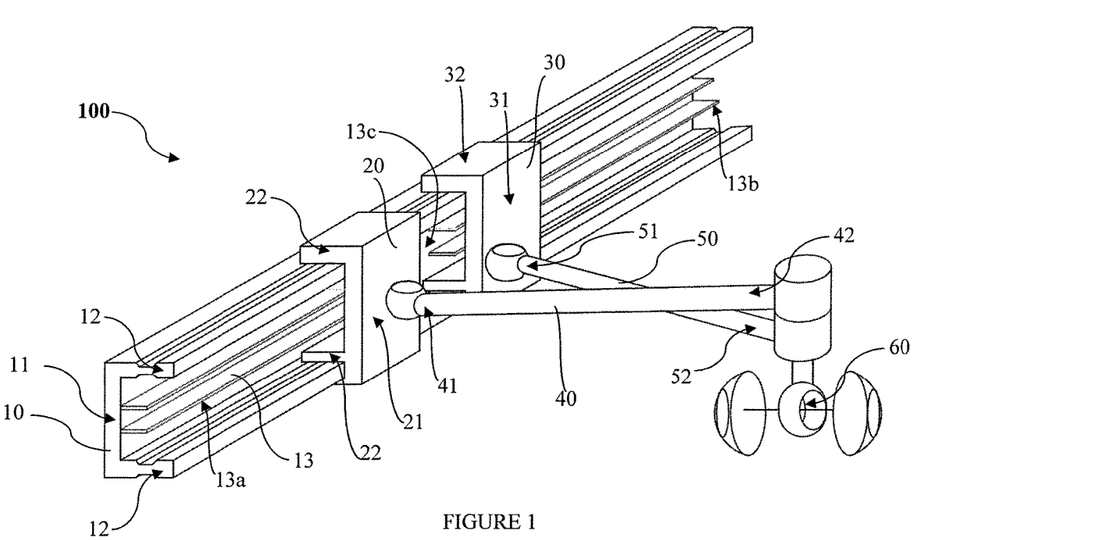
FIG. 1 illustrates a perspective view of a stabilizing device for a vehicle in ON position, in accordance with an embodiment of the present disclosure.

In an embodiment, the first segment 13a and second segment 13b of slide rails 13 are configured to generate a magnetic field having reverse polarity so as to move the plunging elements (23, 33) towards each other. At this instance, as shown in FIG. 1, the stabilizing device 100 is considered to be in ON position. When the stabilizing device 100 is in the ON position, the first support arm 40 and the second arm 50 are automatically extended in outward direction about the vertical axis of the vehicle 70, resulting in deployment of the subsidiary wheel 60 to increase lateral stability of the vehicle 70.

Figure 2:
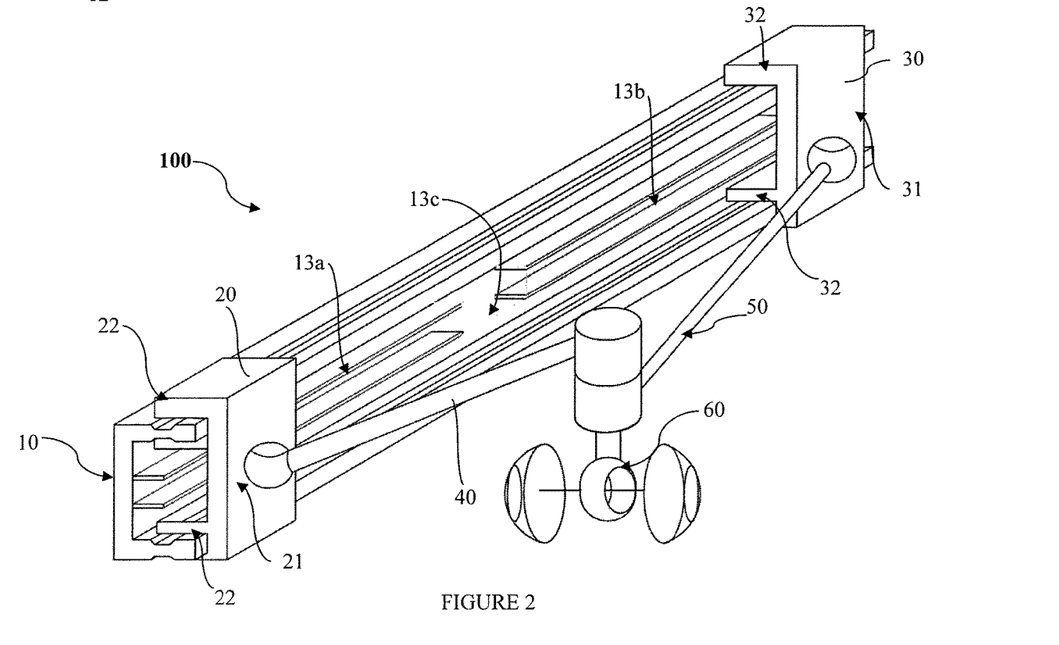
FIG. 2 illustrates a perspective view of a stabilizing device in OFF position in accordance with an embodiment of the present disclosure.

Furthermore, when electric current passing through the slide rails 13 is cut off, the magnetic field will not be generated. As a result, no force is subjected on the plunging elements (23, 33) which in turn results in movement the first slidable unit 20 and the second slidable unit 30 away from each other due to the action of the resilient member 34 interposed between the first slidable unit 20 and the second slidable unit 30. The resilient member 34 holds the momentum of the first slidable unit 20 and the second slidable unit 30 and aids in rapid retracting of the first support arm 40 and the second support arm 50 away from each other. At this instance, as shown in FIG. 2, the stabilizing device 100 is considered to be in an OFF position. At the OFF position, the first support arm 40 and the second support arm 50 is compactly concealed with the fixing unit 10. In an embodiment, the first slider unit 20 and the second slider unit 30 are configured to move towards each other when the first support arm 40 and the second support arm 50 extend in the outward direction about the vertical axis of the vehicle 70. Further, the first slider unit 20 and the second slider unit 30 are configured to move apart from each other when the first support arm 40 and the second support arm 50 extend in inward direction about the vertical axis of the vehicle 70.

Figure 6:
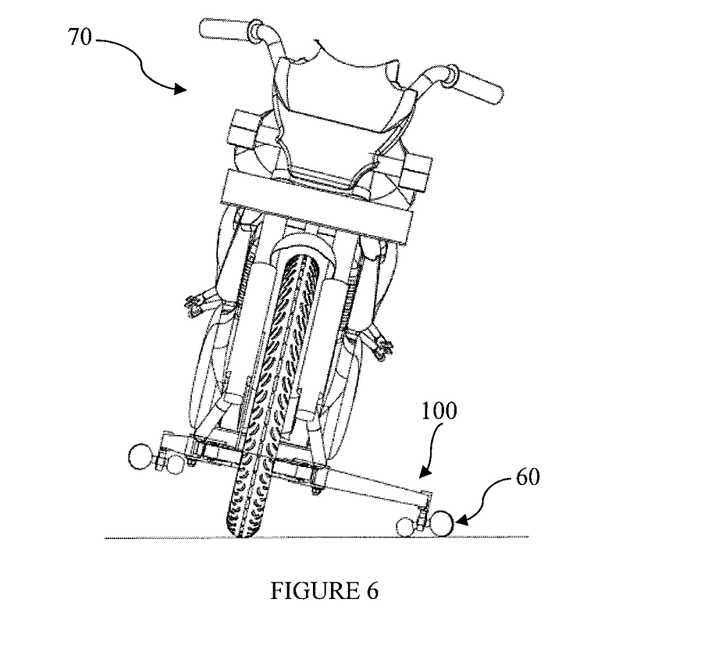
FIG. 6 illustrates a front view of the stabilizing device coupled to the vehicle that is in ON position, of FIG. 5.

In another embodiment, the stabilizing device 100 can be disposed on both sides of the vehicle 70 along a line extending in the vicinity of the centre of gravity of the vehicle 70 as shown in FIG. 3. When there is change in the predetermined value of any one of the set of parameters associated with the vehicle 70, then the plurality of sensors 110 determine that the vehicle 70 is in unstable condition. In an aspect, when the vehicle 70 inclines towards one side or the other as shown in FIG. 6, the stabilizing device 100 is actuated, causing the subsidiary wheel 60 on the inclining side to be first grounded for supporting the vehicle 70 laterally at one side at the longitudinal location of the centre of gravity, and thus effectively preventing subsequent an unstable condition of the vehicle 70 and a tip over thereof.

Figure 4:
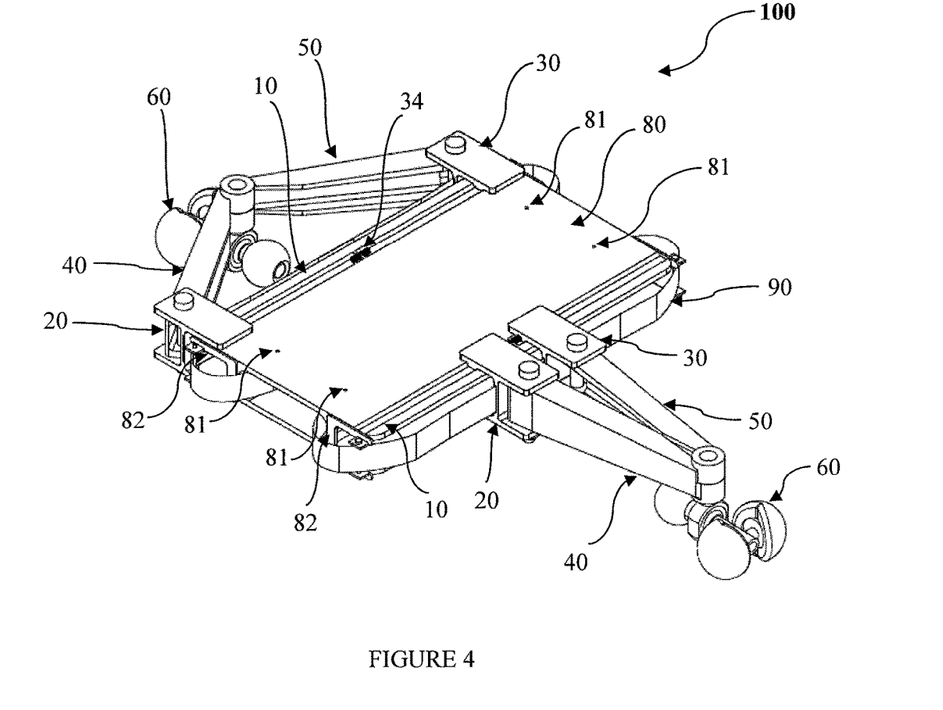
FIG. 4 illustrates a perspective view of the stabilizing device having a support plate, in accordance with an embodiment of the present disclosure.
Figure 5:
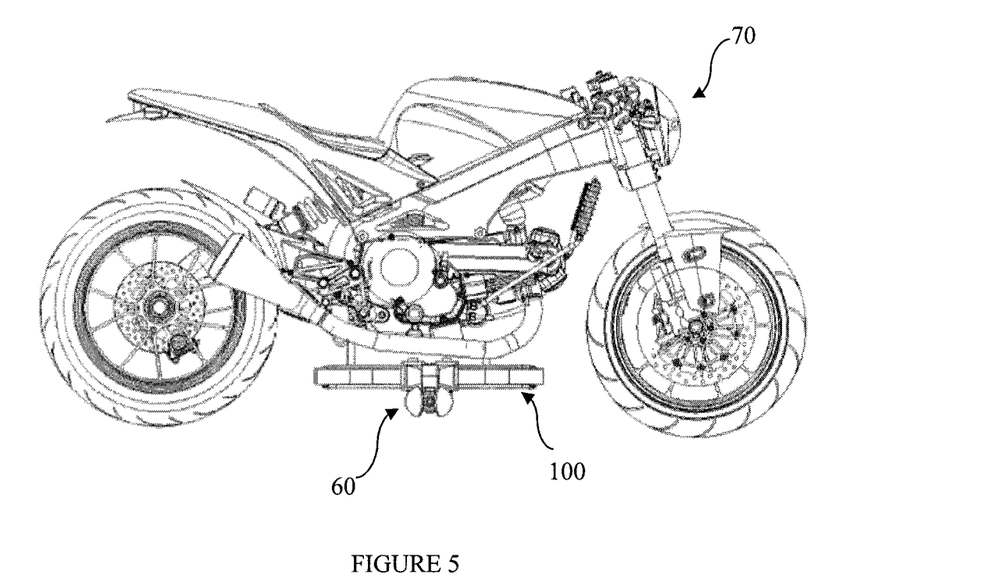
FIG. 5 illustrates a side view of the stabilizing device coupled to the vehicle, in accordance with an embodiment of the present disclosure.

In an embodiment, the stabilizing device 100 comprises a support plate 80 as illustrated in FIG. 4, wherein the fixing unit 10 is detachably coupled to the support plate 80. More specifically, the first slidable unit 20, the second slidable unit 30, the first support arm 40, the second support arm 50 and the wheel 60 are coupled to at least one fixing unit 10. Further, the at least one fixing unit 10 is coupled adjacent to the sides of the vehicle 70. The support plate 80 can be detachably connected to the base of the vehicle 70, preferably to the frame of the vehicle 70, as illustrated in FIG. 5. The support plate 80 is configured with a plurality of apertures 81 thereby facilitating mounting of the support plate 80 to the vehicle 70. In an embodiment, the support plate 80 is thermally joined or mechanically joined to the frame by a plurality of fasteners (not shown in figures).

In an embodiment, may include a locking mechanism, that is configured to secure the first slidable unit 20 and the second slidable unit 30, during the OFF position of the stabilizing device 100. The first and second slidable units 20, 30 are secured by a pair of side plates 82 configured at opposite ends of the fixing unit 10 and are attached to the support plate 80. Further, the first and the second slidable units 20, 30 are push fit on the side plates 82. During the ON position of the stabilizing device 100, the side plates 82 are configured to actuate due to the magnetic field generated and releases the first and second slidable unit 20, 30 from the push fit to slide along the fixing unit 10. In another embodiment, the provision of the side plates 82 prevents collapsing of the first and slidable units 20, 30 from either end of the fixing unit 10.

Further, the fixing unit 10 and the support plate 80 may be covered by removable sheath 90 to prevent incoming of foreign particles, dust particle and, moisture into the first slidable unit 20, second slidable unit 30 and the pair of slide rails 13.

Figure 8:
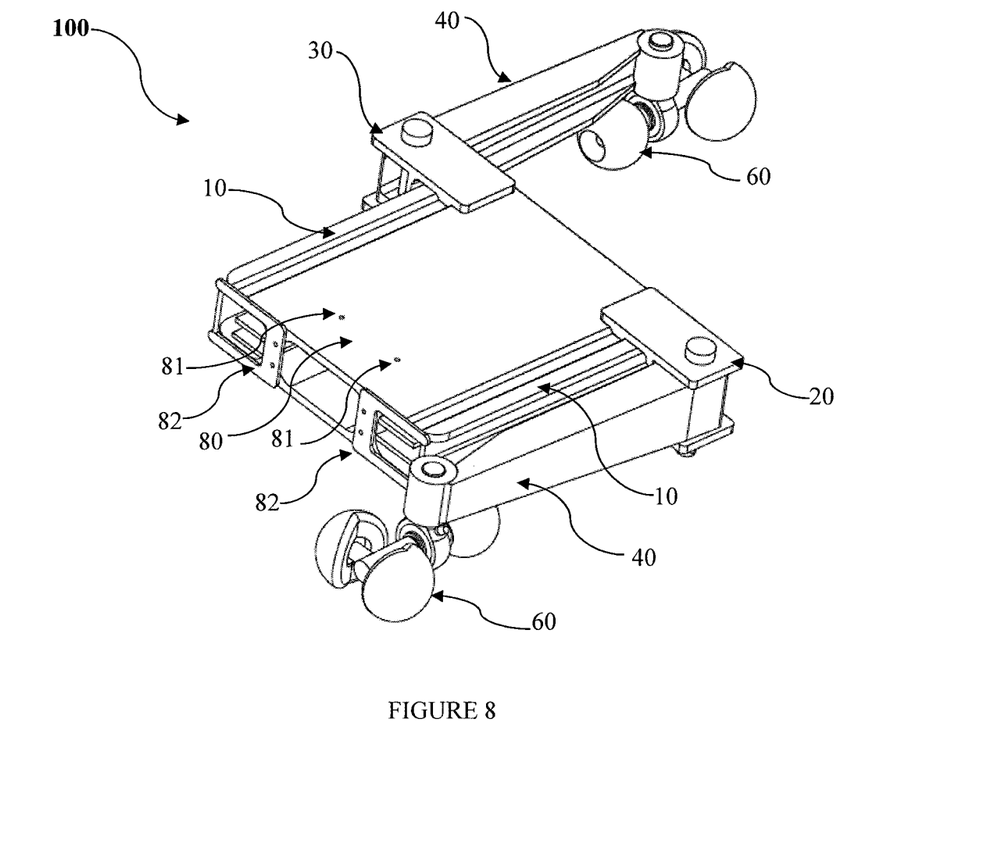
FIG. 8 illustrates a perspective view of another embodiment of the stabilizing device of FIG. 4.

In exemplary embodiment, the stabilization device 100 of the present disclosure can have reduced number of support arms and slidable units as illustrated in FIG. 8 which deploys upon detection of unstable condition of the vehicle 70.

In an embodiment, the stabilizing device 100 according to present disclosure provides a cost-effective solution for stabilizing and balancing the vehicle 70. The stabilization device 100 can be customized and engineered based on the structure of the vehicle 70. Further, the stabilization device 100 has considerably fewer number of parts and also ensures very rapid actuation of the subsidiary wheel 60. Furthermore, the stabilizing device 100 requires less assembly and manufacturing time.

Therefore, those skilled in the art will appreciate the present disclosure that provides many advantages and overcomes various limitations.

In the detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

In one embodiment, the present disclosure relates to the stabilizing device to prevent unstable condition of the vehicle, therefore ensuring safety of the user and the vehicle.

In an embodiment, the present disclosure relates to the stabilizing device which is simple, compact and lighter in weight.

In an embodiment, the present disclosure relates to the stabilizing device, which is operational only when required (i.e., when the vehicle is in unstable condition) thereby reducing the power required to operate the stabilizing device. Further, the stabilising device is light in weight, and the power required to operate the stabilising device may be utilised from the vehicle, considering this aspect, the fuel consumed by the vehicle will be substantially low.

In an embodiment, the present disclosure relates to the stabilizing device that can be applicable for a two-wheeled vehicle, bicycles and the like.

In an embodiment, the present disclosure relates to the stabilizing device which detects unstable condition of the vehicle based on the speed, acceleration, angular velocity and orientation of the vehicle.

In an embodiment, the present disclosure relates to the stabilizing device which can be attached to the vehicle with support plate or without support plate.

In an embodiment, the present disclosure relates to the stabilizing device which is easy and economical to manufacture.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

List of referral numerals:

| Reference Number | Description |
| --- | --- |
| 100 | Stabilizing device |
| 10 | Fixing unit |
| 11 | Main plate |
| 12 | Side strip |
| 13 | Slide rails |
| 13a | First segment |
| 13b | Second segment |
| 13c | Slit |
| 20 | First slidable unit |
| 21 | Base plate |
| 22 | Flanges |
| 23 | Plunging element |
| 30 | Second slidable unit |
| 31 | Base plate |
| 32 | Flange |
| 33 | Plunging element |
| 34 | Resilient member |
| 40 | First support arm |
| 41 | Proximal end |
| 42 | Distal end |
| 50 | Second support arm |
| 51 | Proximal end |
| 52 | Distal end |
| 60 | Wheel |
| 70 | Vehicle |
| 80 | Support plate |
| 81 | Apertures |
| 82 | Side plate |
| 90 | Sheath |
| 110 | Sensor |
| 111 | Power source module |

-continued

List of referral numerals:

| Reference Number | Description |
| --- | --- |
| 112 | Control unit |
| 113 | Energizing unit |

The invention claimed is:

1. A stabilizing device for a vehicle, comprising:
at least one fixing unit, coupled to a base of the vehicle, wherein the fixing unit is defined by a main plate having a pair of side strips formed at opposite sides of the main plate, extending along longitudinal direction of the main plate;
a pair of slide rails mounted centrally on the main plate, and parallel to the pair of side strips, extending along longitudinal direction of the main plate;
a first slidable unit and a second slidable unit, each coupled to the fixing unit, and configured to slide about the pair of side strips along the longitudinal direction of the main plate;
a plunging element coupled to each of the first slidable unit and the second slidable unit and disposed in parallel relation with respect to the pair of slide rails;
a first support arm and a second support arm, respectively coupled to the first slidable unit and the second slidable unit at one end and pivotably coupled to a common wheel at another end, wherein the first support arm and the second support arm are configured to deploy in one of outward and inward direction about a vertical axis of the vehicle; and
a control unit coupled to the pair of slide rails, wherein the control unit is configured to generate a magnetic field, by passing an electric current, in the slide rails and the plunging element;
wherein the magnetic field generated in the slide rails and the plunging element is perpendicular to each other such that the plunging elements provides a motion, due to electromagnetic propulsion to the first slidable unit and the second slidable unit, thereby initiating the deployment of the first support arm and the second support arm to extend in one of outward and inward direction about the vertical axis of the vehicle to stabilize the vehicle.

2. The stabilizing device as claimed in claim 1, wherein the control unit is coupled with a plurality of sensors mounted on said vehicle, wherein the sensors are configured to detect an unstable condition of the vehicle, generate a stabilizing signal upon detection, and transmit the stabilizing signal to the control unit.

3. The stabilizing device as claimed in claim 1, wherein the pair of slide rails comprises a first segment in a spaced apart configuration with a second segment, and the first segment is parallel to the second segment.

4. The stabilizing device as claimed in claim 3 wherein the pair of slide rails mounted on the main plate are made of magnetic, electromagnetic material or adhered with magnetic materials.

5. The stabilizing device as claimed in claim 1, wherein each of the first slidable unit and the second slidable unit comprises a base plate having a pair of side flanges formed at opposite sides of the base plate, extending along the longitudinal direction of the base plate.

6. The stabilizing device as claimed in claim 5 wherein each of the pair of side flanges is configured with a guideway for guiding through the fixed unit.

7. The stabilizing device as claimed in claim 1, wherein the first slider unit and the second slider unit are configured to move towards each other when the first support arm and the second support arm extend in the outward direction about the vertical axis of the vehicle, and further the first slider unit and the second slider unit are configured to move apart from each other when the first support arm and the second support arm to extend in inward direction about the vertical axis of the vehicle.

8. The stabilizing device as claimed in claim 1, wherein the first slidable unit and the second slidable unit are actuated by hydraulic, pneumatic, resilient members and any combination thereof.

9. The stabilizing device as claimed in claim 1, further comprises a power source module in communication with the plurality of sensors and the control unit, wherein the power source module is configured to supply power to the plurality of sensors and the control unit.

10. The stabilizing device as claimed in claim 2, wherein the plurality of sensor includes at least one speed sensor, at least one gyroscopic sensor, at least one accelerometer sensor and at least one position sensor.

11. The stabilizing device as claimed in claim 1, further includes an energizing unit coupled to the control unit and is configured to supply constant electric current to the plunging elements and the pair of slide rails.

12. The stabilizing device as claimed in claim 1, wherein the fixing unit is detachably coupled to a support plate, and the support plate is detachably connected to the base of the vehicle.

13. The stabilizing device as claimed in claim 1, wherein the fixing unit and the support plate are covered by removable sheath to prevent incoming of foreign particles, dust particle and, moisture into the first slidable unit, second slidable unit and the pair of slide rails.

* * * * *